Nov. 3, 1925.　　　　　L. E. FORD　　　　　1,559,950
TOOL RECEPTACLE OR CARRIER
Filed Nov. 5, 1924
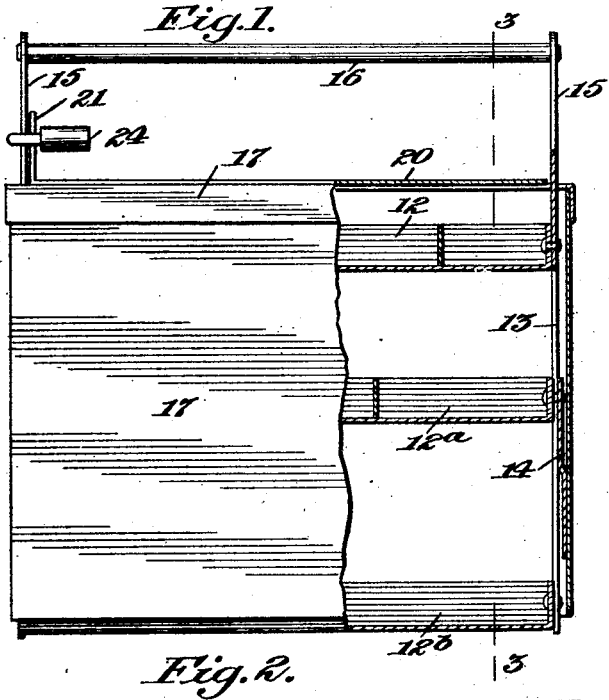
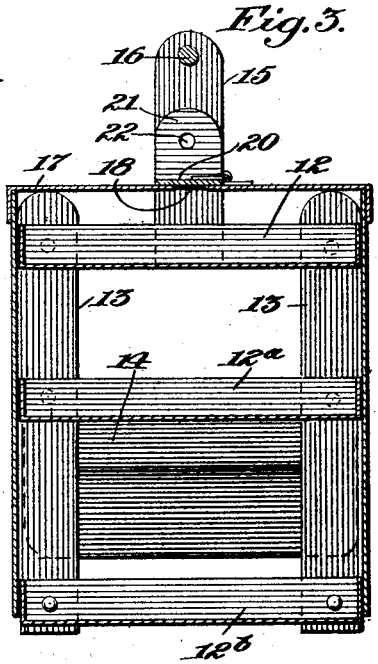
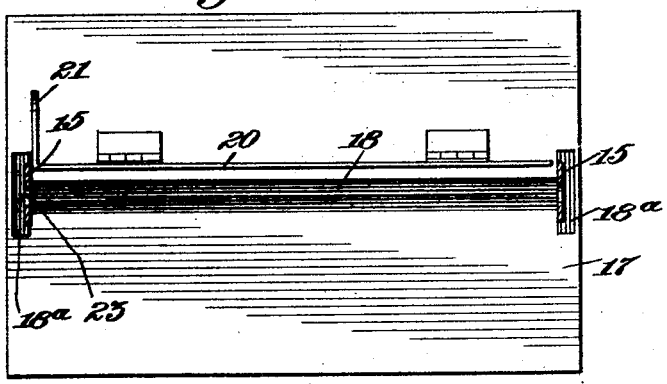
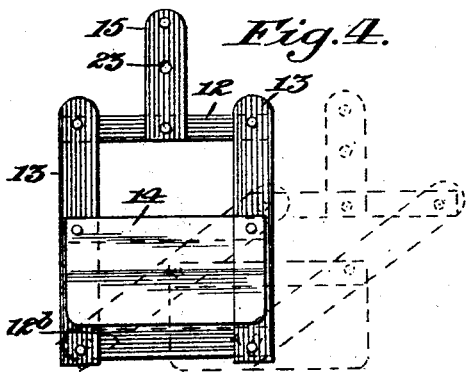
Inventor:
Lewis E. Ford,
by Parker & Parker
Att'ys.

Patented Nov. 3, 1925.

1,559,950

UNITED STATES PATENT OFFICE.

LEWIS E. FORD, OF SALAMANCA, NEW YORK.

TOOL RECEPTACLE OR CARRIER.

Application filed November 5, 1924. Serial No. 747,974.

*To all whom it may concern:*

Be it known that I, LEWIS E. FORD, a citizen of the United States, residing at Salamanca, in the county of Cattaraugus and State of New York, have invented or discovered certain new and useful Improvements in Tool Receptacles or Carriers, of which the following is a specification, reference being had therein to the accompanying drawing.

This invention relates to an improvement on the tool receptacle or carrier shown and described in my Patent No. 1,541,211, granted June 9, 1925, and has for its object to provide an enclosing casing for said receptacle or carrier and which casing is of such construction that it may be fitted over the receptacle or carrier so that, in co-operation with the bottom part or tray of the receptacle or carrier, the latter will be fully enclosed, and the casing, by suitable means, may be locked against removal. Thus the tools or parts in the receptacle may be protected against thievery or unauthorized removal when the receptacle is in a garage or elsewhere.

To this end the casing is constructed with an open bottom and a top which is permanently closed excepting for a suitable longitudinal slot or narrow opening which will permit the casing to be placed down over the handle parts of the receptacle and carrier, and which slot or opening will preferably be adapted to be closed by a hinged lid, all as will hereinafter more fully appear.

In the accompanying drawing Fig. 1 is a side view of the improved casing in operative position, but broken out so as partly to show the receptacle within the casing. Fig. 2 is a top or plan view of the casing with the hinged lid open and with the handle of the receptacle supposed to be within the casing, broken away. Fig. 3 is a transverse section on line 3—3, Fig. 1, and Fig. 4 is an end view of the receptacle with the casing removed and showing, in dotted lines, one of the positions to which it may be adjusted for convenient access to the tools or parts in the trays.

Referring to the drawing, 12, 12$^a$ and 12$^b$ denote the trays which may comprise suitable compartments as shown in my application hereinbefore referred to, said trays being preferably pivotally connected with links or uprights 13, as in the receptacle of said application, to permit the receptacle to be inclined sidewise to the position shown in dotted lines in Fig. 4, or in an opposite direction, for convenient access to the lower trays.

These uprights 13 are at the sides of both ends of the receptacle, as will be understood from the drawing. Attached near each end at its top to said uprights 13, at each end of the receptacle, is a plate 14, preferably of rectangular form with rounded lower corners. When the receptacle is inclined sidewise, as shown in dotted lines in Fig. 4, or in an opposite direction, to render the trays conveniently accessible, these plates will come in contact with a floor or other support on which the receptacle may rest, and will thus serve as stops to limit the sidewise tilting movement of the receptacle.

Extending above the upper tray 12, and preferably rigidly attached to the central part at each end thereof, is an upright 15, said uprights being connected together by a longitudinally extending bar 16, these parts forming a rigid handle by which the receptacle, either with or without the casing 17. may be conveniently carried.

In the normal position of the receptacle the bottoms of the plates 14 are considerably above the bottom of the lowest tray 12$^b$ to permit of the inclined adjustments of the receptacle. When, in the sidewise adjustment of the receptacle, the said plates come in contact with the floor or other support on which the receptacle may rest, a continued downward pressure on the bar 16 of the rigid handle will lift the lowermost tray above the bottoms of the plates 14, as shown in dotted lines in Fig. 4, so that the receptacle will then be supported entirely by said plates 14, and may be moved about on the floor or ground with little friction and without wear on said lowermost tray.

The uprights 13, with which the trays 12, 12$^a$ and 12$^b$ are pivotally connected, and which uprights are at the sides of the ends of the receptacle, extend slightly below the bottom of the lowermost tray 12$^b$, as clearly shown in the drawing, these extensions serving as supporting feet for the receptacle. Owing to these supporting feet the receptacle will stand steadily and will not be liable to tip over, and the more heavily weighted the receptacle is by tools, etc., in the trays the more steadily it will stand. In fact the weighted trays, with the receptacle sustained by the supporting feet just mentioned, will assist in restoring the receptacle to an upright position, when being moved from the position shown in dotted lines in Fig. 4 to the position shown in full lines in said figure, particularly when a nearly upright position of the receptacle has been arrived at.

The casing 17 is constructed with an open bottom and with a permanently closed top excepting for a longitudinal slot or opening 18 in said top, said slot having lateral extensions 18ª at its ends. In putting the casing over the receptacle these slots permit the handle members 15 and 16 to extend through the top of the casing, as will be understood. To close the slot 18 a lid 20 is preferably hinged to the top of the casing, and which lid may be opened when the casing is to be placed over the receptacle or removed therefrom.

The lid 20 is preferably provided at one end with an ear 21 having a hole 22 which, when said lid is closed, will register with a similar hole 23 in one of the handle uprights 15, these holes being for the reception of the shackle of a padlock 24 for securing the casing in place over the receptacle. The receptacle is closed at its bottom by the bottom of the lowermost tray 12ᵇ.

From the foregoing it will be understood that the invention provides a closed receptacle, of convenient construction, for tools and parts, well adapted for use in garages and other places, and which receptacle may be locked to prevent unauthorized access thereto.

Having thus described my invention I claim and desire to secure by Letters Patent:

1. The combination with a receptacle having a closed bottom and adapted to hold tools or the like, said receptacle having handle parts rigidly fixed thereto and extending above the top thereof, of an open-bottomed casing adapted to fit over said receptacle and having a closed top constructed with a suitable opening through which said handle parts may extend when said casing is in place over said receptacle.

2. The combination with a receptacle having a closed bottom and adapted to hold tools or the like, said receptacle having handle parts attached thereto and extending above the top thereof, of an open-bottomed casing adapted to fit over said receptacle and having a closed top constructed with a suitable opening through which said handle parts may extend when said casing is in place over said receptacle, and a hinged lid for closing said opening.

3. The combination with a receptacle having a closed bottom and adapted to hold tools or the like, said receptacle having handle parts attached thereto and extending above the top thereof, of an open-bottomed casing adapted to fit over said receptacle and having a closed top constructed with a suitable opening through which said handle parts may extend when said casing is in place over said receptacle, and a hinged lid for closing said opening, said lid being provided at one end with an ear having a hole and said handle parts comprising uprights and a connecting longitudinal bar, one of said uprights having a hole with which the hole in said ear may register, so that the casing may be locked in place by the shackle of a padlock passed through said holes.

4. A receptacle for tools or the like comprising a plurality of trays, uprights at the sides of the receptacle at each end thereof and with which uprights said trays are pivotally connected, and rectangular supporting plates attached to said uprights at each end of the receptacle, the bottoms of said plates being considerably above the bottom of the lowermost tray when the parts are in normal position.

5. A receptacle, for tools or the like, comprising a plurality of trays disposed one above the other, uprights at the sides of the ends of the receptacle, and with which uprights said trays are pivotally connected, said uprights extending below the bottom of the lowermost tray to afford supporting feet for the receptacle, stop plates attached at their tops to said uprights at the ends of the receptacles, uprights attached to the central portions of the ends of the uppermost tray and extending above said tray, and a longitudinally extending bar connecting said last-named uprights which latter, with said bar, afford a rigid handle for the receptacle.

6. A receptacle, for tools or the like, comprising a plurality of trays disposed one above the other, uprights at the sides of the ends of the receptacle, and with which uprights said trays are pivotally connected, stop plates attached at their tops to said uprights at each end of the receptacle, and a rigid handle attached to the uppermost tray.

7. A receptacle, for tools or the like, comprising a plurality of trays disposed one above the other, uprights at the sides of the ends of the receptacle, and with which uprights said trays are pivotally connected, stop plates being attached at their tops to said uprights at each end of the receptacle, and a rigid handle attached to the uppermost tray, said handle consisting of uprights rigidly attached to the central portions of the ends of the uppermost tray, and a longitudinally extending bar connecting said uprights.

8. A receptacle, for tools or the like, comprising a plurality of trays disposed one above the other, uprights at the sides of the ends of the receptacle and with which uprights said trays are pivotally connected, and a handle consisting of uprights rigidly attached to the central end portions of the uppermost tray and a longitudinally extending bar connecting said last-named uprights, combined with stop plates attached at their tops to said first-named uprights at each end of the receptacle.

In testimony whereof I affix my signature.

LEWIS E. FORD.